(12) United States Patent
Zilli et al.

(10) Patent No.: US 12,545,795 B2
(45) Date of Patent: Feb. 10, 2026

(54) RESIN COMPOSITION FOR AQUEOUS INK

(71) Applicant: Harima Chemicals, Incorporated, Kakogawa (JP)

(72) Inventors: Dario Zilli, Haven (BE); Hironori Matsushima, Haven (BE); Dave Kil, Maastricht (NL); Wietze Bakker, Maastricht (NL); David Bainbridge, Elgin, IL (US)

(73) Assignee: HARIMA CHEMICALS, INCORPORATED, Kakogawa (JP)

( * ) Notice: Subject to any disclaimer, the term of this patent is extended or adjusted under 35 U.S.C. 154(b) by 826 days.

(21) Appl. No.: 17/785,448

(22) PCT Filed: Dec. 3, 2020

(86) PCT No.: PCT/JP2020/045037
§ 371 (c)(1),
(2) Date: Jun. 15, 2022

(87) PCT Pub. No.: WO2021/124908
PCT Pub. Date: Jun. 24, 2021

(65) Prior Publication Data
US 2023/0033455 A1 Feb. 2, 2023

(30) Foreign Application Priority Data
Dec. 20, 2019 (JP) .................. 2019-230662

(51) Int. Cl.
*C09D 11/105* (2014.01)

(52) U.S. Cl.
CPC .................. *C09D 11/105* (2013.01)

(58) Field of Classification Search
CPC .................................................. C09D 11/105
See application file for complete search history.

(56) References Cited

U.S. PATENT DOCUMENTS

| | | | |
|---|---|---|---|
| 5,312,482 A | 5/1994 | Chambers et al. | |
| 6,165,258 A | 12/2000 | Asada | |
| 2010/0197851 A1* | 8/2010 | Breiner | C09D 167/08 524/502 |
| 2011/0039977 A1 | 2/2011 | Schuetz et al. | |
| 2013/0197152 A1 | 8/2013 | Herve et al. | |
| 2017/0190935 A1 | 7/2017 | Schaapman et al. | |
| 2019/0161704 A1 | 5/2019 | Delplancke et al. | |

FOREIGN PATENT DOCUMENTS

| | | | |
|---|---|---|---|
| CN | 1927957 A | 3/2007 | |
| CN | 103228700 A | 7/2013 | |
| EP | 3 279 276 A1 | 2/2018 | |
| JP | H0885726 A | 4/1996 | |
| JP | 2000017215 A | 1/2000 | |
| JP | 2000234074 A | 8/2000 | |
| JP | 2006-077125 A | 3/2006 | |
| JP | 2008007684 A | 1/2008 | |
| JP | 2008056746 A | 3/2008 | |
| JP | 2008-255194 A | 10/2008 | |
| JP | 2010024305 A | 2/2010 | |
| JP | 2012-012485 A | 1/2012 | |
| JP | 2016216670 A | 12/2016 | |
| JP | 2018016717 A | 2/2018 | |
| JP | 2018131548 A | 8/2018 | |
| JP | 2019501276 A | 1/2019 | |
| JP | 2019094491 A | 6/2019 | |
| WO | WO-2019009697 A1 * | 1/2019 | A01N 25/04 |
| WO | 2019064634 A1 | 4/2019 | |

OTHER PUBLICATIONS

Examination Report issued on Sep. 9, 2024, by the Intellectual Property India, Government of India in corresponding Indian Patent Application No. 202217034587, and an English Translation of the Examination Report. (5 pages).
International Search Report (PCT/ISA/210) with translation and Written Opinion (PCT/ISA/237) mailed on Mar. 2, 2021, by the Japanese Patent Office as the International Searching Authority for International Application No. PCT/JP2020/045037. (8 pages).
Dai et al., "Ink Composition Characteristics and Deinking of Waste Paper", Nanjing Forestry University, Nanjing 210037, China, (Mar. 15, 2003), pp. 5-8, with an English translation. (19 pages) (Cited in Notice of Allowance issued Jul. 6, 2023, in corresponding Chinese Patent Application No. 202080086001.6).
Extended European Search Report issued on Dec. 13, 2023, by the European Patent Office in corresponding European Application No. 20903217.6. (5 pages).
Notification Concerning Transmittal of the International Preliminary Report on Patentability, Notification of Transmittal of Translation of the International Preliminary Report on Patentability (Forms PCT/IB/326, PCT/IB/338 and PCT/IB/373) and the Written Opinion of the International Searching Authority (Form PCT/ISA/237) issued Jun. 30, 2022, by the International Bureau of WIPO in corresponding International Application No. PCT/JP2020/045037. (10 pages).

* cited by examiner

Primary Examiner — Catherine S Branch
Assistant Examiner — Olga Lucia Donahue
(74) Attorney, Agent, or Firm — BUCHANAN INGERSOLL & ROONEY PC

(57) ABSTRACT

A resin composition for an aqueous ink includes a base resin, an aqueous dispersion medium, and an emulsifier. The base resin includes a rosin-modified alkyd resin. The emulsifier includes an anionic emulsifier and a nonionic emulsifier. The anionic emulsifier includes an oxyalkylene-containing anionic emulsifier. An HLB value of the nonionic emulsifier is 16.0 or more and 20.0 or less.

8 Claims, No Drawings

RESIN COMPOSITION FOR AQUEOUS INK

TECHNICAL FIELD

The present invention relates to a resin composition for an aqueous ink, to be specific, to a resin composition for an aqueous ink including a base resin.

BACKGROUND ART

Conventionally, a resin composition for an aqueous ink used in packaging materials or the like contains a petroleum-based resin such as acrylic resin.

In recent years, from the viewpoint of suppressing environmental destruction, it has been considered that all or a part of a material of the petroleum-based resin is replaced with a material derived from biomass to cope with carbon neutrality.

As a resin corresponding to carbon neutrality, for example, a polyester resin containing a fatty acid and a rosin and/or a derivative thereof has been proposed. Also, an aqueous dispersion liquid containing such a polyester resin and an anionic surfactant and/or a nonionic surfactant has been proposed (ref: for example, Patent Document 1).

CITATION LIST

Patent Document

Patent Document 1: U.S. Unexamined Patent Application Publication No. 2013/0197152

SUMMARY OF THE INVENTION

Problem to be Solved by the Invention

However, when the above-described aqueous dispersion liquid is used for an ink, there may be a case where the storage stability of the ink is not sufficient, and there is a problem that the water resistance of a coating film of the ink is not sufficient.

The present invention provides a resin composition for an aqueous ink which is capable of contributing to carbon neutrality, and further obtaining excellent storage stability and water resistance.

Means for Solving the Problem

The present invention [1] includes a resin composition for an aqueous ink including a base resin, an aqueous dispersion medium, and an emulsifier, wherein the base resin includes a rosin-modified alkyd resin, the emulsifier includes an anionic emulsifier and a nonionic emulsifier, the anionic emulsifier includes an oxyalkylene-containing anionic emulsifier, and an HLB value of the nonionic emulsifier is 16.0 or more and 20.0 or less.

The present invention [2] includes the resin composition for an aqueous ink described in the above-described [1], wherein the number of units of oxyalkylene contained in one molecule of the oxyalkylene-containing anionic emulsifier is 5 or more.

The present invention [3] includes the resin composition for an aqueous ink described in the above-described [1] or [2], wherein the number of units of oxyalkylene contained in one molecule of the oxyalkylene-containing anionic emulsifier is 10 or more and 18 or less.

The present invention [4] includes the resin composition for an aqueous ink described in any one of the above-described [1] to [3], wherein the nonionic emulsifier includes an oxyalkylene-containing nonionic emulsifier, and the number of units of oxyalkylene contained in one molecule of the oxyalkylene-containing nonionic emulsifier is 30 or more.

The present invention [5] includes the resin composition for an aqueous ink described in any one of the above-described [1] to [4], wherein the nonionic emulsifier contains a block copolymer of ethylene oxide and propylene oxide.

The present invention [6] includes the resin composition for an aqueous ink described in any one of the above-described [1] to [5], wherein the rosin-modified alkyd resin is a reaction product of a resin material containing rosins, a fatty acid and/or an oil and fat, a polybasic acid, and a polyhydric alcohol.

The present invention [7] includes the resin composition for an aqueous ink described in the above-described [6], wherein the polybasic acid includes an aromatic dicarboxylic acid.

The present invention [8] includes the resin composition for an aqueous ink described in the above-described [7], wherein a content ratio of the aromatic dicarboxylic acid with respect to the total amount of the resin material is 11% by mass or more and 23% by mass or less.

Effect of the Invention

In the resin composition for an aqueous ink of the present invention, a base resin includes a rosin-modified alkyd resin. Since the rosin-modified alkyd resin includes a material derived from plants, the resin composition for an aqueous ink can contribute to carbon neutrality.

In addition, in the resin composition for an aqueous ink of the present invention, an emulsifier includes an anionic emulsifier containing an oxyalkylene group in a molecule. Therefore, particles of the rosin-modified alkyd resin are excellently formed in the resin composition for an aqueous ink.

In addition, in the resin composition for an aqueous ink of the present invention, the emulsifier includes a nonionic emulsifier having an HLB value within a predetermined range. Therefore, it is possible to improve the stability of the particles of the rosin-modified alkyd resin in the use of an ink composition. As a result, the resin composition for an aqueous ink of the present invention has excellent storage stability, further has excellent film formability, and therefore, also has excellent water resistance of a coating film.

DESCRIPTION OF EMBODIMENTS

A resin composition for an aqueous ink of the present invention contains a base resin, an aqueous dispersion medium, and an emulsifier.

The base resin includes, as an essential component, a rosin-modified alkyd resin.

Since the rosin-modified alkyd resin is a reaction product of a resin material (described later) containing a compound derived from plants, it can contribute to carbon neutrality, and further, it is possible to improve gloss, film formability, water resistance, and strength of a coating film.

More specifically, the rosin-modified alkyd resin is a reaction product obtained by a reaction of a resin material containing rosins, a fatty acid and/or an oil and fat, a polybasic acid, and a polyhydric alcohol.

The rosins are a compound derived from plants, and more specifically, a compound derived from pines. The rosins are not particularly limited, and examples thereof include known rosins and/or derivatives of these.

Examples of the rosin (unmodified rosin) include material rosins such as gum rosin, tall rosin, and wood rosin, and purified products of these (purified rosins).

The kind of the pine which is a material of the rosin is not particularly limited, and examples thereof include Merkus pines, Slash pines (marshy pines), and Masson pines. A production area of the rosin is not particularly limited, and examples thereof include China, Vietnam, Indonesia, and Brazil.

These rosins may be used alone or in combination of two or more.

Examples of the rosin derivative include hydrogenated rosin obtained by hydrogenating the above-described rosin, disproportionated rosin obtained by disproportionating the above-described rosin, polymerized rosin obtained by polymerizing the above-described rosin, and unsaturated carboxylic acid-modified rosin obtained by modifying the above-described rosin with an unsaturated carboxylic acid (for example, maleic acid, maleic anhydride, fumaric acid, methacrylic acid, etc.).

These rosin derivatives may be used alone or in combination of two or more.

These rosins may be used alone or in combination of two or more.

As the rosins, from the viewpoint of storage stability, film formability, and water resistance, preferably, a rosin (unmodified rosin) is used, more preferably, a tall rosin is used.

Although a content ratio of the rosins with respect to the total amount of the resin material depends on the content ratio of the fatty acid and/or the oil and fat to be described later, from the viewpoint of adjusting a softening point of the rosin-modified alkyd resin, improving film formability, and improving water resistance, gloss, and sense of touch (tack resistance) of a coating film, the content ratio of the rosins is, for example, 30% by mass or more, preferably 40% by mass or more, more preferably 44% by mass or more, further more preferably 53% by mass or more, and from the viewpoint of suppressing the embrittlement of the rosin-modified alkyd resin, improving film formability, and improving water resistance, gloss, and touch of sense (tack resistance) of a coating film, the content ratio of the rosins is, for example, 80% by mass or less, preferably 70% by mass or less, more preferably 64% by mass or less, more preferably 58% by mass or less.

The fatty acid and/or the oil and fat are/is contained in the resin material in order to improve the flexibility and the emulsifiability of the rosin-modified alkyd resin.

Examples of the fatty acid include fatty acid having 12 or more carbon atoms (long-chain fatty acid), fatty acid having 8 to 11 carbon atoms (medium-chain fatty acid), and fatty acid having 7 or less carbon atoms (short-chain fatty acid).

Examples of the fatty acid having 12 or more carbon atoms (long-chain fatty acid) include saturated fatty acid having 12 or more carbon atoms and unsaturated fatty acid having 12 or more carbon atoms.

Examples of the saturated fatty acid having 12 or more carbon atoms include lauric acid (12 carbon atoms), myristic acid (14 carbon atoms), palmitic acid (16 carbon atoms), and stearic acid (18 carbon atoms). These may be used alone or in combination of two or more.

Examples of the unsaturated fatty acid having 12 or more carbon atoms include a-linolenic acid (18 carbon atoms), linoleic acid (18 carbon atoms), and oleic acid (18 carbon atoms). These may be used alone or in combination of two or more.

Examples of the fatty acid having 8 to 11 carbon atoms (medium-chain fatty acid) include caprylic acid (8 carbon atoms) and capric acid (10 carbon atoms). These may be used alone or in combination of two or more.

Examples of the fatty acid having 7 or less carbon atoms (short-chain fatty acid) include acetic acid (2 carbon atoms), butyric acid (4 carbon atoms), and caproic acid (6 carbon atoms). These may be used alone or in combination of two or more.

Further, examples of the fatty acid include mixed fatty acids (unpurified fatty acids).

Examples of the mixed fatty acid include mixed fatty acid including a long-chain fatty acid (unpurified fatty acid), and more specifically, examples thereof include mixed fatty acid derived from animal oil and fat such as beef tallow fatty acid, lard fatty acid, fish oil fatty acid, and hydrogenated (cured) fatty acid of these, and mixed fatty acid derived from vegetable oil and fat such as tall oil fatty acid, soybean oil fatty acid, linseed oil fatty acid, tung oil fatty acid, coconut oil fatty acid, castor oil fatty acid, and hydrogenated (cured) fatty acid of these. These may be used alone or in combination of two or more.

These fatty acids may be used alone or in combination of two or more.

The fatty acid preferably includes a fatty acid having 12 or more carbon atoms (long-chain fatty acid).

As the fatty acid, more preferably, a mixed fatty acid including a long-chain fatty acid is used, more preferably, a mixed fatty acid derived from a vegetable oil and fat is used, further more preferably, a tall oil fatty acid and a soybean oil fatty acid are used, particularly preferably, a soybean oil fatty acid is used.

The oil and fat is an esterified product of three molecules of fatty acids and one molecule of glycerin.

Examples of the fatty acid to be esterified with the glycerin in the oil and fat include the above-described fatty acid having 12 or more carbon atoms (long-chain fatty acid), the above-described fatty acid having 8 to 11 carbon atoms (medium-chain fatty acid), and the above-described fatty acid having 7 or less carbon atoms (short-chain fatty acid). These may be used alone or in combination of two or more.

The fatty acid to be esterified with the glycerin preferably includes the above-described fatty acid having 12 or more carbon atoms (long-chain fatty acid), and if necessary, includes the above-described fatty acid having 8 to 11 carbon atoms (medium-chain fatty acid) and the above-described fatty acid having 7 or less carbon atoms (short-chain fatty acid) at an appropriate ratio.

More specifically, examples of the oil and fat include animal oils and fats such as beef tallow, lard, and fish oil, and vegetable oils and fats such as soybean oil, linseed oil, tung oil, coconut oil, castor oil, palm oil, and rapeseed oil. Further, examples thereof include regenerated oils collected and regenerated after use of these oils and fats. These may be used alone or in combination of two or more.

As the oil and fat, preferably, a vegetable oil and fat is used, more preferably, a soybean oil is used.

The content ratio of the fatty acid and/or the oil and fat (when used in combination, the total amount of these) with respect to the total amount of the resin material is, from the viewpoint of flexibility and emulsifiability, for example, 1% by mass or more, preferably 3% by mass or more, more preferably 5% by mass or more, further more preferably 7% by mass or more, and for example, 40% by mass or less, preferably 30% by mass or less, more preferably 20% by mass or less, further more preferably 15% by mass or less.

Examples of the polybasic acid include divalent carboxylic acid, trivalent carboxylic acid, and tetravalent or more carboxylic acid.

Examples of the divalent carboxylic acid include aromatic dicarboxylic acid, aliphatic dicarboxylic acid, and alicyclic dicarboxylic acid.

The aromatic dicarboxylic acid is not particularly limited, and examples thereof include isophthalic acid, terephthalic acid, phthalic acid, diphenylmethane-4,4'-dicarboxylic acid, 2,6-naphthalenedicarboxylic acid, and acid anhydride of these. These may be used alone or in combination of two or more.

Examples of the aliphatic dicarboxylic acid include chain aliphatic dicarboxylic acids such as oxalic acid, malonic acid, succinic acid, glutaric acid, adipic acid, azelaic acid, pimelic acid, suberic acid, sebacic acid, undecanedioic acid, dodecanedioic acid, and tridecanedioic acid. These may be used alone or in combination of two or more.

Examples of the alicyclic dicarboxylic acid include hexahydrophthalic acid, hexahydrophthalic anhydride, 1,4-cyclohexanedicarboxylic acid, and 1,2-cyclohexanedicarboxylic acid. These may be used alone or in combination of two or more.

These divalent carboxylic acids may be used alone or in combination of two or more.

Examples of the trivalent carboxylic acid include aromatic tricarboxylic acids such as trimellitic acid and naphthalene tricarboxylic acid. These may be used alone or in combination of two or more.

Examples of the tetravalent or more carboxylic acid include tetravalent to octavalent carboxylic acids such as aromatic tetracarboxylic acids such as pyromellitic acid, and alicyclic tetracarboxylic acids such as cyclohexane tetracarboxylic acid and methylcyclohexane tetracarboxylic acid. These may be used alone or in combination of two or more.

These polybasic acids may be used alone or in combination of two or more.

As the polybasic acid, from the viewpoint of controlling a reaction rate, preferably, a divalent carboxylic acid is used, more preferably, an aromatic dicarboxylic acid is used, further more preferably, a terephthalic acid is used.

The content ratio of the aromatic dicarboxylic acid with respect to the total amount of the polybasic acid is, for example, 50% by mass or more, preferably 70% by mass or more, more preferably 80% by mass or more, further more preferably 90% by mass or more, particularly preferably 100% by mass.

That is, the polybasic acid preferably consists of the aromatic dicarboxylic acid.

The content ratio of the polybasic acid (preferably, the aromatic dicarboxylic acid) with respect to the total amount of the resin material is, from the viewpoint of stability of the rosin-modified alkyd resin and miscibility with the pigment, and further, water resistance of a coating film, for example, 5% by mass or more, preferably 8% by mass or more, more preferably 11% by mass or more, further more preferably 16% by mass or more, and from the viewpoint of controlling a reaction rate, for example, 40% by mass or less, preferably 30% by mass or less, more preferably 23% by mass or less, further more preferably 20% by mass or less.

Examples of the polyhydric alcohol include dihydric alcohols, trihydric alcohols, and tetrahydric or more alcohols.

Examples of the dihydric alcohol include straight-chain alkyl diols having 2 to 10 carbon atoms such as ethylene glycol, 1,3-propanediol, 1,4-butanediol, 1,5-pentanediol, and 1,6-hexanediol; branched chain alkyl diols having 3 to 10 carbon atoms such as propylene glycol, 1,3-butanediol, 1,2-butanediol, 3-methyl-1,5-pentanediol, and 2,6-dimethyl-1-octene-3,8-diol; ether diols such as diethylene glycol, triethylene glycol, and dipropylene glycol; 1,4-dihydroxy-2-butene; isosorbide; 1,3- or 1,4-cyclohexanedimethanol and mixtures of these; 1,4-cyclohexanediol; tricyclodecanedimethylol; bisphenol A; hydrogenated bisphenol A; hydrogenated bisphenol F; hydrogenated bisphenol S; hydrogenated catechol; hydrogenated resorcin; hydrogenated hydroquinone; and dicyclopentadienediallyl alcohol copolymer. These may be used alone or in combination of two or more.

Examples of the trihydric alcohol include trimethylolalkanes such as glycerin, trimethylolethane, trimethylolpropane, trimethylolhexane, and trimethyloloctane. These may be used alone or in combination of two or more.

Examples of the tetrahydric or more alcohol include tetrahydric to octahydric alcohols such as pentaerythritol, diglycerin, ditrimethylolpropane, sorbitan, sorbitol, dipentaerythritol, inositol, and tripentaerythritol. These may be used alone or in combination of two or more.

As the polyhydric alcohol, from the viewpoint of water resistance of a coating film, preferably, a trihydric alcohol and a tetrahydric or more alcohol are used, more preferably, a trihydric alcohol is used, further more preferably, trimethylolpropane, glycerin, and pentaerythritol are used, particularly preferably, glycerin is used.

The content ratio of the polyhydric alcohol with respect to the total amount of the resin material is, for example, 5% by mass or more, preferably 8% by mass or more, more preferably 12% by mass or more, further more preferably 13% by mass or more, and for example, 30% by mass or less, preferably 25% by mass or less, more preferably 20% by mass or less, further more preferably 17% by mass or less.

An equivalent ratio (hydroxyl group/carboxy group) of hydroxyl groups (total amount of the hydroxyl group in the polyhydric alcohol and the hydroxyl group derived from the glycerin in the oil and fat) in the resin material to carboxy groups (total amount of the carboxy group in the rosins, the carboxy group in the fatty acid and/or the oil and fat, and the carboxy group in the polybasic acid) in the resin material is, from the viewpoint of adjusting an acid value of the rosin-modified alkyd resin, for example, 1.00 or more, preferably 1.10 or more, more preferably 1.14 or more, and from the viewpoint of water resistance of a coating film, for example, 1.50 or less, preferably 1.40 or less, more preferably 1.36 or less, particularly preferably 1.14.

Then, the rosin-modified alkyd resin can be obtained as a reaction product by reacting the above-described resin material by a known method.

A reaction method is not particularly limited, and the resin material can be subjected to a collective reaction or a multi-stage reaction. Preferably, the above-described resin material is subjected to a multi-stage reaction.

More specifically, in this method, first, components excluding the polybasic acid in the resin material, that is, the rosins, the fatty acid and/or the oil and fat, and the polyhydric alcohol are charged into a reaction vessel at the above-described ratio, and heated in a state in which an inert gas such as nitrogen gas is flowed in. Thus, the rosins, the fatty acid and/or the oil and fat, and the polyhydric alcohol are subjected to a condensation polymerization reaction (primary reaction), thereby producing an intermediate product (primary product).

The reaction conditions in the condensation polymerization reaction are not particularly limited, and a reaction temperature is, for example, 150° C. or more, preferably 170° C. or more, and for example, 300° C. or less, preferably 280° C. or less. Further, the reaction time is, for example, one hour or more, preferably five hours or more, and for example, 48 hours or less, preferably 24 hours or less.

In addition, in this reaction, if necessary, condensed water which is generated in the condensation polymerization reaction (primary reaction) is distilled off by a known method.

In addition, in the above-described reaction, if necessary, a reaction catalyst can be also added at an appropriate ratio. Examples of the reaction catalyst include hydroxides of alkali metals, oxides and hydroxides of alkaline earth metals, sulfonic acids, tetrabutyl zirconate, monobutyl tin oxide, zirconium naftate, and tetrabutyl titanate. These may be used alone or in combination of two or more.

The above-described reaction continues until the acid value of the intermediate product (primary product) to be obtained reaches a predetermined value.

That is, the acid value of the intermediate product (primary product) is determined by the ratio of the rosins, the fatty acid and/or the oil and fat, and the polyhydric alcohol.

Therefore, the acid value of the intermediate product (primary product) is obtained from the ratio of the rosins, the fatty acid and/or the oil and fat, and the polyhydric alcohol, and the completion of the above-described reaction is judged at the time of reaching the acid value.

The acid value of the intermediate product (primary product) is, for example, 1 mgKOH/g or more, preferably 5 mgKOH/g or more, and for example, 30 mgKOH/g or less, preferably 25 mgKOH/g or less, more preferably 20 mgKOH/g or less.

The acid value is measured in conformity with JIS K 5601-2-1 (1999) (hereinafter, the same applies).

Next, in this method, the polybasic acid is added to the intermediate product (primary product) obtained as described above at the above-described ratio, and subjected to an esterification reaction (secondary reaction). Thus, as a reaction product (secondary product) of the resin material, the rosin-modified alkyd resin can be obtained.

The reaction conditions in the esterification reaction are not particularly limited, and the reaction temperature is, for example, 150° C. or more, preferably 170° C. or more, and for example, 300° C. or less, preferably 280° C. or less. Further, the reaction time is, for example, one hour or more, preferably five hours or more, and for example, 48 hours or less, preferably 24 hours or less.

In addition, in this reaction, if necessary, water which is generated in the esterification reaction is distilled off by a known method.

In addition, in the above-described reaction, if necessary, the above-described reaction catalyst can be also added at an appropriate ratio.

Then, in this method, when the acid value of the obtained rosin-modified alkyd resin (secondary product) reaches a predetermined value, the above-described reaction is stopped.

In other words, the acid value of the rosin-modified alkyd resin (secondary product) is determined by the ratio of each component of the resin material. Therefore, the acid value of the rosin-modified alkyd resin (secondary product) at the completion of the reaction is obtained from the ratio of each component of the resin material, and the reaction vessel is cooled to stop the reaction at the time of reaching the acid value.

The acid value of the rosin-modified alkyd resin is, for example, 1 mgKOH/g or more, preferably 5 mgKOH/g or more, and for example, 30 mgKOH/g or less, preferably 20 mgKOH/g or less, more preferably 15 mgKOH/g or less.

A method for obtaining the rosin-modified alkyd resin is not limited to the description above, and the rosin-modified alkyd resin can be also obtained by subjecting each component of the resin material to a multi-stage reaction at an appropriate order or a collective reaction by a known method until the acid value reaches the above-described range.

Further, if necessary, the resin material is reacted in the presence of a known solvent, and the rosin-modified alkyd resin can be also prepared as a solution or a dispersion liquid.

A weight average molecular weight (in terms of standard polystyrene) of the rosin-modified alkyd resin is, for example, 1,000 or more, preferably 3,000 or more, more preferably 5,000 or more, and for example, 100,000 or less, preferably 50,000 or less, more preferably 10,000 or less.

In addition, the softening point (measurement method: Mettler method) of the rosin-modified alkyd resin is, from the viewpoint of improving film formability and improving water resistance, gloss, and touch of sense (tack resistance) of a coating film, for example, 70° C. or more, preferably 75° C. or more, more preferably 80° C. or more, and for example, 120° C. or less, preferably 105° C. or less, more preferably 90° C. or less.

In addition, in order to obtain desired properties, the base resin may also contain, as an optional component, another resin for an ink (resin for an ink excluding the above-described rosin-modified alkyd resin).

Examples of the other resin for an ink include known base resins, and examples thereof include acrylic resins, styrene-modified acrylic resins, silicone acrylic resins, modified silicone acrylic resins, rosin phenol resins, rosin ester resins, terpene phenol resins, coumarone indene resins, petroleum resins, epoxy resins, modified epoxy resins, polyester resins, vinyl acetate resins, ethylene-vinyl acetate resins, urethane resins, urea resins, melamine resins, and cellulose resins. These may be used alone or in combination of two or more.

The content ratio of the other resin for an ink is appropriately set as long as it does not inhibit the excellent effect of the present invention.

Examples of the aqueous dispersion medium include water and a hydrophilic solvent which is mixable with water.

Examples of the hydrophilic organic solvent include alcohols such as methanol and ethanol; ketones such as acetone; ethers such as dioxane and tetrahydrofuran; ether alcohols such as cellosolve and carbitol; ether alcohol acetates such as cellosolve acetate and carbitol acetate; and nitriles such as acetonitrile. These may be used alone or in combination of two or more.

As the aqueous dispersion medium, preferably, water is used.

The emulsifier includes an anionic emulsifier and a nonionic emulsifier. When the emulsifier includes the anionic emulsifier, it is possible to excellently form particles of the base resin in the aqueous dispersion medium. Further, when the emulsifier includes the nonionic emulsifier, it is possible to improve the stability of the particles of the base resin.

The anionic emulsifier includes, as an essential component, an oxyalkylene-containing anionic emulsifier.

The oxyalkylene-containing anionic emulsifier is an anionic emulsifier containing an oxyalkylene group in a molecule.

Examples of the oxyalkylene include oxyethylene, oxypropylene, oxytrimethylene, and oxybutylene.

These oxyalkylenes may be used alone or in combination of two or more.

In addition, when two or more kinds of oxyalkylenes are used in combination, the oxyalkylene may be block copolymerized or randomly copolymerized.

As the oxyalkylene, preferably, an oxyethylene and an oxypropylene are used, more preferably, an oxyethylene is used.

More specifically, examples of the oxyalkylene-containing anionic emulsifier include polyoxyalkylene alkyl ether sulfates, polyoxyalkylene aryl ether sulfates, polyoxyalkylene alkyl aryl ether sulfates, polyoxyalkylene alkyl ether phosphates, polyoxyalkylene alkyl aryl ether phosphates, and polyoxyalkylene alkyl ether carboxylates.

Examples of the polyoxyalkylene alkyl ether sulfates include sodium polyoxyethylene octyl ether sulfate, sodium polyoxyethylene lauryl ether sulfate, sodium polyoxyethylene isotridecyl ether sulfate, and sodium polyoxyethylene oleyl ether sulfate.

An example of the polyoxyalkylene aryl ether sulfates includes sodium polyoxyethylene styrylphenyl ether sulfate.

An example of the polyoxyalkylene alkyl aryl ether sulfates includes sodium polyoxyethylene nonylphenyl ether sulfate.

Examples of the polyoxyalkylene alkyl ether phosphates include polyoxyethylene oleyl ether phosphate, polyoxyethylene octadecyl ether phosphate, sodium polyoxyethylene stearyl ether phosphate, sodium polyoxyethylene oleyl ether phosphate, and polyoxyethylene isotridecyl ether phosphate.

An example of the polyoxyalkylene aryl ether phosphates includes polyoxyethylene phenyl ether phosphate.

An example of the polyoxyalkylene alkyl ether carboxylates includes sodium polyoxyethylene lauryl ether carboxylate.

These oxyalkylene-containing anionic emulsifiers may be used alone or in combination of two or more.

As the oxyalkylene-containing anionic emulsifier, preferably, polyoxyalkylene alkyl ether sulfates and polyoxyalkylene alkyl ether phosphates are used.

The number of units of oxyalkylene contained in one molecule of the oxyalkylene-containing anionic emulsifier is, from the viewpoint of stabilization of particles, for example, 2 or more, preferably 4 or more, more preferably 8 or more, further more preferably 10 or more, particularly preferably 15 or more, and from the viewpoint of water resistance, for example, 80 or less, preferably 60 or less, more preferably 30 or less, further more preferably 18 or less.

Further, the anionic emulsifier may include, as an optional component, an anionic emulsifier containing no oxyalkylene in a molecule (hereinafter, an oxyalkylene-free anionic emulsifier).

Examples of the oxyalkylene-free anionic emulsifier include alkyl aryl sulfonates such as dodecyl benzene sulfonate. These oxyalkylene-free anionic emulsifiers may be used alone or in combination of two or more.

The content ratio of the oxyalkylene-free anionic emulsifier is appropriately set as long as it does not inhibit the excellent effect of the present invention.

Preferably, the anionic emulsifier does not contain the oxyalkylene-free anionic emulsifier, and consists of the oxyalkylene-containing anionic emulsifier.

The nonionic emulsifier is selected so that an HLB value is adjusted within a range to be described later.

An example of the nonionic emulsifier includes an oxyalkylene-containing nonionic emulsifier.

The oxyalkylene-containing nonionic emulsifier is a nonionic emulsifier containing an oxyalkylene in a molecule.

In the oxyalkylene-containing nonionic emulsifier, examples of the oxyalkylene include oxyethylene, oxypropylene, oxytrimethylene, and oxybutylene.

These oxyalkylenes may be used alone or in combination of two or more.

In addition, when two or more kinds of oxyalkylenes are used in combination, the oxyalkylene may be block copolymerized or randomly copolymerized.

As the oxyalkylene, preferably, an oxyethylene and an oxypropylene are used.

More specifically, examples of the oxyalkylene-containing nonionic emulsifier include polyoxyalkylene alkyl ethers, polyoxyalkylene aryl ethers, polyoxyalkylene alkyl aryl ethers, and polyoxyalkylene higher fatty acid esters and ether addition products thereof Examples of the polyoxyalkylene alkyl ethers include polyoxyethylene lauryl ether, polyoxyethylene oleyl ether, and polyoxyethylene cetyl (ceto) oleyl ether.

An example of the polyoxyalkylene aryl ethers includes polyoxyethylene styrylphenyl ether.

An example of the polyoxyalkylene alkyl aryl ethers includes polyoxyethylene nonylphenyl ether.

Examples of the polyoxyalkylene higher fatty acid esters include polyoxyethylene monolaurate, polyoxyethylene monooleate, and polyoxyethylene cetyl (ceto) monooleate.

Further, an example of the ether addition product of the polyoxyalkylene higher fatty acid esters includes a reaction product of the above-described polyoxyalkylene higher fatty acid esters and the above-described polyhydric alcohol.

The oxyalkylene-containing nonionic emulsifier further includes, for example, an ether addition product obtained by adding a polyoxyalkylene to the polyhydric alcohol, the oil and fat, or the like.

Further, an example of the oxyalkylene-containing nonionic emulsifier includes a copolymer of ethylene oxide and another alkylene oxide (hereinafter, an EOAO copolymer).

Examples of the other alkylene oxide include propylene oxide, trimethylene oxide, and butylene oxide. These may be used alone or in combination of two or more. As the other alkylene oxide, preferably, propylene oxide is used.

More specifically, examples of the EOAO copolymer include a copolymer of ethylene oxide and propylene oxide (hereinafter, an EOPO copolymer), a copolymer of ethylene oxide and butylene oxide (hereinafter, an EOBO copolymer), and a copolymer of ethylene oxide, propylene oxide, and butylene oxide (hereinafter, an EOPOBO copolymer). These may be used alone or in combination of two or more.

In addition, in the EOAO copolymer, each polymerization unit may be block copolymerized or randomly copolymerized.

As the EOAO copolymer, preferably, a copolymer of ethylene oxide and propylene oxide (EOPO copolymer) is used, more preferably, a block copolymer of ethylene oxide and propylene oxide (EOPO block copolymer) is used.

In addition, in the block copolymer, a single or a plurality of polymerization blocks of the ethylene oxide may be used. Further, a single or a plurality of polymerization blocks of the other alkylene oxide may be used.

More specifically, for example, the EOPO block copolymer may be an EOPO block copolymer (H-(EO)x-(PO)y-OH) having one polymerization block of ethylene oxide having a repeating number of units x (polyoxyethylene unit:

(EO)x) and one polymerization block of propylene oxide having a repeating number of units y (polyoxypropylene unit: (PO)y).

Further, the EOPO block copolymer may be, for example, an EOPO block copolymer (H-(EO)x-(PO)y-(EO)z-OH) having a polymerization block of ethylene oxide having a repeating number of units x (first polyoxyethylene unit: (EO)x), a polymerization block of ethylene oxide having a repeating number of units z (second polyoxyethylene unit: (EO)z), and a polymerization block of propylene oxide having a repeating number of units y (polyoxypropylene unit: (PO)y) which is contained between the polymerization blocks of the ethylene oxides.

In the EOAO block copolymer, the repeating number of units and the weight average molecular weight of the ethylene oxide, and the repeating number of units and the weight average molecular weight of the other alkylene oxide are appropriately set so that the HLB value is within a range to be described later.

These oxyalkylene-containing nonionic emulsifiers may be used alone or in combination of two or more.

As the oxyalkylene-containing nonionic emulsifier, preferably, polyoxyethylene alkyl ethers, and a copolymer of ethylene oxide and another alkylene oxide are used, more preferably, a polyoxyethylene oleyl ether, and a block copolymer of ethylene oxide and propylene oxide are used, further more preferably, a combination of these is used.

In the oxyalkylene-containing nonionic emulsifier, the repeating number of units (total amount) of the oxyalkylene is appropriately set so that the HLB value is within a range to be described later.

More specifically, the number of units of the oxyalkylene contained in one molecule of the oxyalkylene-containing nonionic emulsifier is, from the viewpoint of stabilization of particles, for example, 20 or more, preferably 30 or more, more preferably 50 or more, further more preferably 80 or more, and from the viewpoint of water resistance, for example, 500 or less, preferably 400 or less, more preferably 300 or less, particularly preferably 150 or less.

Further, an example of the nonionic emulsifier includes a nonionic emulsifier containing no oxyalkylene in a molecule (hereinafter, an oxyalkylene-free nonionic emulsifier).

The oxyalkylene-free nonionic emulsifier is not particularly limited, and examples thereof include an esterification reaction product of a higher fatty acid and polyglycerin, an esterification reaction product of a higher fatty acid and sucrose, and an esterification reaction product of a higher fatty acid and polysaccharide.

These oxyalkylene-free nonionic emulsifiers may be used alone or in combination of two or more.

These nonionic emulsifiers may be used alone or in combination of two or more.

The nonionic emulsifier preferably does not include the oxyalkylene-free nonionic emulsifier, and consists of the oxyalkylene-containing nonionic emulsifier.

The HLB value of the nonionic emulsifier is, from the viewpoint of storage stability, 16.0 or more, preferably 16.5 or more, more preferably 17.0 or more, further more preferably 17.5 or more, particularly preferably 18.0 or more, and from the viewpoint of water resistance, 20.0 or less, preferably 19.5 or less, more preferably 19.0 or less.

The HLB value of the nonionic emulsifier is calculated by a Griffin method.

In addition, when two or more kinds of nonionic emulsifiers are used in combination, the HLB value is an HLB value of the total amount (mixture) of the nonionic emulsifier.

In the emulsifier, a mass ratio of the anionic emulsifier and the nonionic emulsifier is not particularly limited. For example, a ratio of the anionic emulsifier with respect to the total amount of the anionic emulsifier and the nonionic emulsifier is, for example, 10% by mass or more, preferably 30% by mass or more, more preferably 50% by mass or more, further more preferably 55% by mass or more, and for example, 90% by mass or less, preferably 80% by mass or less, more preferably 70% by mass or less. Further, a ratio of the nonionic emulsifier with respect to the total amount of the anionic emulsifier and the nonionic emulsifier is, for example, 10% by mass or more, preferably 20% by mass or more, more preferably 30% by mass or more, and for example, 90% by mass or less, preferably 70% by mass or less, more preferably 50% by mass or less, further more preferably 45% by mass or less.

Then, the resin composition for an aqueous ink of the present invention is obtained by mixing the base resin, the aqueous dispersion medium, and the emulsifier (further, if necessary, a neutralizing agent and an additive) by a known method.

The content ratio of the base resin with respect to the total amount of the base resin, the aqueous dispersion medium, and the emulsifier is, for example, 30% by mass or more, preferably 40% by mass or more, and for example, 70% by mass or less, preferably 60% by mass or less.

Further, the content ratio of the aqueous dispersion medium with respect to the total amount of the base resin, the aqueous dispersion medium, and the emulsifier is, for example, 30% by mass or more, preferably 40% by mass or more, and for example, 70% by mass or less, preferably 60% by mass or less.

Further, the content ratio of the anionic emulsifier with respect to the total amount of the base resin, the aqueous dispersion medium, and the emulsifier is, for example, 1% by mass or more, preferably 3% by mass or more, and for example, 10% by mass or less, preferably 5% by mass or less.

Further, the content ratio of the nonionic emulsifier with respect to the total amount of the base resin, the aqueous dispersion medium, and the emulsifier is, for example, 1% by mass or more, preferably 2% by mass or more, and for example, 10% by mass or less, preferably 7% by mass or less.

Further, in terms of the solid content, the ratio of the anionic emulsifier with respect to 100 parts by mass of the base resin is, for example, 2 parts by mass or more, preferably 6 parts by mass or more, and for example, 20 parts by mass or less, preferably 10 parts by mass or less.

Further, in terms of the solid content, the ratio of the nonionic emulsifier with respect to 100 parts by mass of the base resin is, for example, 2 parts by mass or more, preferably 4 parts by mass or more, and for example, 20 parts by mass or less, preferably 14 parts by mass or less.

The mixing of the base resin, the aqueous dispersion medium, and the emulsifier is not particularly limited as long as the particles of the base resin can be formed and dispersed in the aqueous dispersion medium, and a known method can be used.

For example, first, the base resin is heated and melted, and next, the emulsifier is added to the melted resin and stirred. Thereafter, the aqueous dispersion medium is added to the mixture of the melted resin and an emulsion. Thus, it is possible to disperse the particles of the base resin in the aqueous dispersion medium.

In addition, in the above-described method, for example, the anionic emulsifier and the nonionic emulsifier may be added simultaneously. Further, for example, after a part of the anionic emulsifier and the nonionic emulsifier (preferably, the anionic emulsifier) is added, and mixed with the aqueous dispersion medium, a remaining part of the anionic emulsifier and the nonionic emulsifier (preferably, the nonionic emulsifier) may be also added.

In addition, in the above-described method, if necessary, a neutralizing agent such as ammonia may be appropriately added, and an anionic group of the anionic emulsifier may be also neutralized.

A pH of the resin composition for an aqueous ink is, for example, 5.0 or more, preferably 6.0 or more, and for example, 9.0 or less, preferably 8.0 or less.

In addition, in the above-described method, if necessary, by using the aqueous dispersion medium which is heated in advance, it is also possible to improve the mixing efficiency.

Further, if necessary, the resin composition for an aqueous ink may contain an additive. Examples of the additive include known additives such as pigment dispersant, desiccant, anti-sagging agent, rust inhibitor, plasticizer, coating film surface modifier (wax), antioxidant, ultraviolet absorber, and surfactant. These may be used alone or in combination of two or more. An addition ratio of the additive is appropriately set in accordance with its purpose and application.

In addition, in the resin composition for an aqueous ink, if necessary, the solid content concentration is adjusted and the viscosity is adjusted by adding or removing the above-described aqueous dispersion medium.

The solid content concentration of the resin composition for an aqueous ink is, for example, 20% by mass or more, preferably 30% by mass or more, and for example, 80% by mass or less, preferably 60% by mass or less.

Further, the viscosity at 25° C. of the resin composition for an aqueous ink is, for example, 10 mPa·s or more, preferably 50 mPa·s or more, and for example, 2000 mPa·s or less, preferably 1000 mPa·s or less.

The viscosity is measured in conformity with Examples to be described later (hereinafter, the same applies).

In addition, in the resin composition for an aqueous ink, an average particle size (measurement method: laser diffraction method) of the rosin-modified alkyd resin is, for example, 0.01 μm or more, preferably 0.1 μm or more, and for example, 10 μm or less, preferably 1.0 μm or less.

Then, in the resin composition for an aqueous ink, the base resin includes the rosin-modified alkyd resin. Since such a resin includes a material derived from plants, the resin composition for an aqueous ink can contribute to carbon neutrality.

In the above-described resin composition for an aqueous ink, the base resin includes the rosin-modified alkyd resin. The rosin-modified alkyd resin includes a material derived from plants, the resin composition for an aqueous ink can contribute to carbon neutrality.

In addition, in the above-described resin composition for an aqueous ink, the emulsifier includes the anionic emulsifier containing an oxyalkylene in a molecule. Therefore, particles of the rosin-modified alkyd resin are excellently formed in the resin composition for an aqueous ink.

In addition, in the above-described resin composition for an aqueous ink, the emulsifier includes the nonionic emulsifier having an HLB value within a predetermined range. Therefore, it is possible to improve the stability of the particles of the rosin-modified alkyd resin in the use of an ink composition (described later). As a result, the resin composition for an aqueous ink of the present invention has excellent storage stability, further has excellent film formability, and therefore, also has excellent water resistance of the coating film.

A method for forming the coating film is not particularly limited, and first, an ink composition is prepared.

The ink composition is not particularly limited as long as it includes the above-described resin composition for an aqueous ink, and for example, the above-described resin composition for an aqueous ink can be used as it is as an ink composition (for example, an overprint varnish).

Further, if necessary, the ink composition may contain a pigment in addition to the above-described resin composition for an aqueous ink.

Examples of the pigment include known pigments such as carbon black, titanium oxide, calcium carbonate, iron oxide, barium sulfate, silica, clay, talc, quinacridone-based pigment, azo-based pigment, nitroso-based pigment, and phthalocyanine-based pigment. These pigments may be used alone or in combination of two or more.

The content ratio (solid content) of the pigment with respect to 100 parts by mass of the base resin (solid content) in the resin composition for an aqueous ink is, for example, 20 parts by mass or more, preferably 40 parts by mass or more, and for example, 150 parts by mass or less, preferably 120 parts by mass or less.

Further, the ink composition preferably contains another resin for an ink (resin for an ink excluding the above-described rosin-modified alkyd resin) in addition to the above-described resin composition for an aqueous ink.

Examples of the other resin for an ink include the above-described known base resins.

The content ratio of the other resin for an ink is not particularly limited, and is appropriately set in accordance with its purpose and application.

As the other resin for an ink, preferably, a high acid value water-soluble resin is used. As such a resin, more specifically, a styrene-modified acrylic resin is used.

When, as the other resin for an ink, the high acid value water-soluble resin is blended into the ink composition, it is possible to improve the gloss of the coating film. On the other hand, when the high acid value water-soluble resin is blended, the stability of the particles of the rosin-modified alkyd resin usually decreases, and the storage stability of the ink composition decreases. However, when the above-described resin composition for an aqueous ink is included in the ink composition, it is possible to improve the particles of the rosin-modified alkyd resin, and even when the high acid value water-soluble resin is blended, it is possible to obtain excellent storage stability.

Further, if necessary, the ink composition may contain an additive. Examples of the additive include known additives such as pigment dispersant, desiccant, anti-sagging agent, rust inhibitor, plasticizer, coating film surface modifier (wax), antioxidant, ultraviolet absorber, and surfactant. These may be used alone or in combination of two or more. The addition ratio of the additive is appropriately set in accordance with its purpose and application.

In addition, in the ink composition, if necessary, the solid content concentration is adjusted and the viscosity is adjusted by adding or removing the above-described aqueous dispersion medium.

The solid content concentration of the ink composition is, for example, 10% by mass or more, preferably 20% by mass or more, and for example, 80% by mass or less, preferably 60% by mass or less.

Further, the viscosity at 25° C. of the ink composition is, for example, 10 mPa·s or more, preferably 50 mPa·s or more, and for example, 2000 mPa·s or less, preferably 1000 mPa·s or less.

Then, a method for producing a coating film is not particularly limited, and an ink composition is applied to an object to be coated and dried by a known method.

An application method is not particularly limited, and examples thereof include application using a commonly used device during application such as roll coater, bar coater, doctor blade, meyer bar, and air knife, and known application methods such as screen printing, offset printing, flexo printing, brush coating, spray coating, gravure coating, and reverse gravure coating.

As the drying conditions, a drying temperature is, for example, 10° C. or more, preferably 20° C. or more, and for example, 90° C. or less, preferably 80° C. or less. Further, the drying time is, for example, 12 hours or more, preferably 24 hours or more.

Thus, it is possible to cure the ink composition. As a result, the coating film is obtained as a cured product of the ink composition.

Since such a coating film is obtained by curing the ink composition including the above-described resin composition for an aqueous ink, it has excellent water resistance.

Therefore, the coating film is, for example, preferably used as an aqueous flexographic ink, an aqueous gravure ink, or the like, in coating of food packaging materials or the like.

EXAMPLES

Next, the present invention is further described based on Examples and Comparative Examples. The present invention is however not limited by Examples and Comparative Examples below. All designations of "part" or "parts" and "%" mean part or parts by mass and % by mass, respectively, unless otherwise particularly specified. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Production Example 1 (Base Resin 1)

Glycerin (14 parts) and 12 parts of soybean oil were added to 55 parts of melted tall rosin, and the temperature of the mixture was increased to 240 to 260° C. to be subjected to condensation polymerization (dehydration reaction).

Then, when an acid value reached 10 mgKOH/g or less, it was cooled to 150° C. or less, and thereafter, 19 parts of terephthalic acid was added thereto. The temperature of the mixture was increased to 260 to 275° C. to be subjected to an esterification reaction.

Thus, a base resin 1 having an acid value of 18 mgKOH/g and a softening point (Mettler method) of 90° C. was obtained. A ratio of an aromatic dicarboxylic acid (terephthalic acid) with respect to a resin material (solid content) of the base resin 1 was 19% by mass.

In the above-described reaction, an equivalent ratio (hydroxyl group/carboxy group) of hydroxyl groups in the glycerin (including the glycerin derived from the soybean oil) with respect to carboxy groups (total amount) derived from a fatty acid in the tall rosin, the terephthalic acid, and the soybean oil was 1.14.

Production Example 2 (Base Resin 2)

Glycerin (14 parts) and 5 parts of soybean oil were added to 65 parts of melted tall rosin, and the temperature of the mixture was increased to 240 to 260° C. to be subjected to condensation polymerization (dehydration reaction).

Then, when the acid value reached 10 mgKOH/g or less, it was cooled to 150° C. or less, and thereafter, 10 parts of terephthalic acid and 6 parts of adipic acid were added thereto. The temperature of the mixture was increased to 260 to 275° C. to be subjected to an esterification reaction.

Thus, a base resin 2 having an acid value of 12 mgKOH/g and a softening point (Mettler method) of 89° C. was obtained. A ratio of the aromatic dicarboxylic acid (terephthalic acid) with respect to the resin material (solid content) of the base resin 2 was 10% by mass.

In the above-described reaction, the equivalent ratio (hydroxyl group/carboxy group) of hydroxyl groups in the glycerin (including the glycerin derived from the soybean oil) with respect to carboxy groups (total amount) derived from the fatty acid in the tall rosin, the terephthalic acid, the adipic acid, and the soybean oil was 1.14.

Examples 1 to 13 and Comparative Examples 1 to 6

A resin composition for an aqueous ink was obtained in accordance with the formulations of Tables 1 to 4.

More specifically, for example, in Example 1, first, 1000 parts of base resin was put into a pressure-resistant reaction vessel and melted at 150 to 170° C.

Next, the melted base resin was cooled, and 30 parts (in terms of solid content) of anionic emulsifier, 20 parts (in terms of solid content) of nonionic emulsifier, and 2 parts of ammonia water (25%) were added thereto at 135 to 150° C. Then, the mixture was cooled to about 100° C., while a stirring speed was gradually increased.

Then, as an aqueous dispersion medium, heated water (hot water) was gradually added to the resulting mixture, and the solid content thereof was adjusted to about 65 to 85% by mass.

Next, the solid content concentration thereof was adjusted to 48 to 55% by mass so that the viscosity was 200 to 400 mPa·s by increasing the stirring speed with further addition of the hot water.

Thereafter, the stirring was continued for about 5 to 10 minutes, and the resulting mixture was cooled to room temperature.

Thus, the resin composition for an aqueous ink was obtained.

Each of the following emulsifiers was used as the anionic emulsifier and the nonionic emulsifier.

Anionic Emulsifier

A-1: sodium polyoxyethylene (EO15) isotridecyl (C13) ether sulfate, EO number of units of 15, solid content concentration of 100%

A-2: polyoxyethylene (EO9) isotridecyl (C13) ether phosphate, EO number of units of 9, solid content concentration of 100%

A-3: polyoxyethylene (EO7) oleyl (C18) ether phosphate, EO number of units of 7, solid content concentration of 100%

A-4: isotridecyl (C13) alcohol ether phosphate, EO number of units of 0, solid content concentration of 100%

A-5: dodecylbenzenesulfonic acid, EO number of units of 0, solid content concentration of 100%

A-6: polyoxyethylene (EO20) isotridecyl (C13) ether phosphate, EO number of units of 20, solid content concentration of 100%

A-7: isotridecyl (C13) alcohol ether sulfate, EO number of units of 2, solid content concentration of 100%

A-8: isotridecyl (C13) alcohol ether sulfate, EO number of units of 4, solid content concentration of 100%

A-9: isotridecyl (C13) alcohol ether sulfate, EO number of units of 50, solid content concentration of 100%

Nonionic Emulsifier

N-1: polyoxyethylene (EO80) oleyl (C18) alcohol, EO number of units of 80, solid content concentration of 100%, HLB value of 18.5

N-2: block copolymer of ethylene oxide and propylene oxide (EOPO copolymer), EO number of units of 300, weight average molecular weight of PO polymerization block of 3250, solid content concentration of 100%, HLB value of 16

N-3: polyoxyethylene (EO35) oleyl (C18) alcohol, EO number of units of 35, solid content concentration of 100%, HLB value of 17.2

N-4: polyoxyethylene (EO100) oleyl (C18) alcohol, EO number of units of 100, solid content concentration of 100%, HLB value of 19

N-5: polyoxyethylene (EO60) cetyl oleyl (C17) alcohol, EO number of units of 60, solid content concentration of 100%, HLB value of 18.1

N-6: polyoxyethylene (EO15) oleyl (C18) alcohol, EO number of units of 15, solid content concentration of 100%, HLB value of 15

Evaluation (1) Preparation of Ink Composition

At 200 rpm, 15 parts of styrene-modified acrylic resin (trade name: Joncryl (JONCRYL) 61, manufactured by BASF SE, 35% ammonia aqueous solution) and 6 parts of wax (trade name: FLEXONIX (Flexonix) W 378E, manufactured by LAWTER (Lawter)) as a coating film surface modifier were mixed.

Then, 39 parts of resin composition for an aqueous ink was added to the resulting mixture at 100 to 800 rpm, and further, 35 parts of pigment aqueous dispersion (phthalocyanine blue PB-15:3, solid content of 40%) was added thereto.

Thereafter, 5 parts of water was added at the stirring speed of 1000 rpm.

Thus, 100 parts of ink composition was obtained.

The solid content of the ink composition was about 40% by mass.

(2) Storage Stability

The ink composition was stored in a sealed vessel at room temperature, the initial viscosity immediately after production of the ink composition and the viscosity after storage in two weeks were measured, and a viscosity change rate (viscosity after storage/initial viscosity) was calculated.

The viscosity was measured under the following conditions.

Device: Brookfield rotational viscometer (manufactured by Brookfield Japan)
Temperature: 25° C.
Rotor: Spindle 2
Number of rotations: 100 rpm Then, the storage stability was evaluated from the viscosity change rate on the basis of the following criteria.

A+: viscosity change rate of below 10%
A: viscosity change rate of 10% or more and below 15%
A−: viscosity change rate of 15% or more and below 20%
B: viscosity change rate of 20% or more and below 25%
B−: viscosity change rate of 25% or more and below 30%
C: viscosity change rate of 30% or more
D: test impossible (water dispersion impossible)

(3) Water Resistance

An ink composition was applied to a coated paper (100 g/m$^2$) using a bar coater (6 microns), and dried at 50° C. for 30 seconds.

Thereafter, the water resistance of the coated surface was tested (COBB test based on ISO535-1991).

More specifically, 100 g of water was dropped onto the paper surface of 100 cm$^2$ using a cylinder, and the water was wiped off in 10 minutes.

Then, a difference between the weight of the paper after wiping, and the weight of the paper before the test was measured.

At this time, it was evaluated that the less the difference in weight, the more excellent the water resistance of the coating film.

The criteria for the evaluation are described as follows.

A: difference in weight of below 100 g/m$^2$
B: difference in weight of 100 g/m$^2$ or more and below 120 g/m$^2$
C: difference in weight of 120 g/m$^2$ or more
D: test impossible (water dispersion impossible)

TABLE 1

| | No. | | Ex. 1 | Ex. 2 | Ex. 3 | Ex. 4 | Ex. 5 |
|---|---|---|---|---|---|---|---|
| Mixing Formulation (parts by mass) | Base Resin | Kind | 1 | 1 | 1 | 1 | 1 |
| | | Amount | 1000 | 1000 | 1000 | 1000 | 1000 |
| | Anionic Emulsifier | A-1 | 30 | 30 | — | — | 30 |
| | | A-2 | — | — | 45 | — | — |
| | | A-3 | — | — | — | 65 | — |
| | | A-4 | — | — | — | — | — |
| | | A-5 | — | — | — | — | — |
| | | A-6 | — | — | — | — | — |
| | | A-7 | — | — | — | — | — |
| | | A-8 | — | — | — | — | — |
| | | A-9 | — | — | — | — | — |
| | Nonionic Emulsifier | N-1 | 20 | — | 20 | 20 | 20 |
| | | N-2 | — | 20 | — | — | 20 |
| | | N-3 | — | — | — | — | — |
| | | N-4 | — | — | — | — | — |
| | | N-5 | — | — | — | — | — |
| | | N-6 | — | — | — | — | — |
| | Neutralizing Agent | | 2 | 2 | 2.5 | 2.5 | 2 |
| | Aqueous Dispersion Medium | Water | 1000 | 1000 | 1000 | 1000 | 1000 |
| Solid Content Concentration (%) | | | 48-55 | 48-55 | 48-55 | 48-55 | 48-55 |
| AO Number of Anionic Emulsifier | | | 15 | 15 | 9 | 7 | 15 |
| HLB of Nonionic Emulsifier | | | 18.5 | 16 | 18.5 | 18.5 | 18.5, 16 |

TABLE 1-continued

| No. | | Ex. 1 | Ex. 2 | Ex. 3 | Ex. 4 | Ex. 5 |
|---|---|---|---|---|---|---|
| AO Number of Nonionic Emulsifier | | 80 | 300 | 80 | 80 | 80, 300 |
| Evaluation | Storage Stability | A | A | B | B- | A+ |
| | Water Resistance | A | A- | A | A | A |

TABLE 2

| No. | | | Ex. 6 | Ex. 7 | Ex. 8 | Ex. 9 |
|---|---|---|---|---|---|---|
| Mixing Formulation (parts by mass) | Base Resin | Kind | 1 | 2 | 1 | 1 |
| | | Amount | 1000 | 1000 | 1000 | 1000 |
| | Anionic Emulsifier | A-1 | 30 | 30 | 30 | 30 |
| | | A-2 | — | — | — | — |
| | | A-3 | — | — | — | — |
| | | A-4 | — | — | — | — |
| | | A-5 | — | — | — | — |
| | | A-6 | — | — | — | — |
| | | A-7 | — | — | — | — |
| | | A-8 | — | — | — | — |
| | | A-9 | — | — | — | — |
| | Nonionic Emulsifier | N-1 | — | 20 | — | — |
| | | N-2 | — | — | — | — |
| | | N-3 | 20 | — | — | — |
| | | N-4 | — | — | 20 | — |
| | | N-5 | — | — | — | 20 |
| | | N-6 | — | — | — | — |
| | Neutralizing Agent | | 2 | 2 | 2 | 2 |
| | Aqueous Dispersion Medium | Water | 1000 | 1000 | 1000 | 1000 |
| Solid Content Concentration (%) | | | 48-55 | 48-55 | 48-55 | 48-55 |
| AO Number of Anionic Emulsifier | | | 15 | 15 | 15 | 15 |
| HLB of Nonionic Emulsifier | | | 17.2 | 18.5 | 19 | 18.1 |

TABLE 2-continued

| No. | | Ex. 6 | Ex. 7 | Ex. 8 | Ex. 9 |
|---|---|---|---|---|---|
| AO Number of Nonionic Emulsifier | | 35 | 80 | 100 | 60 |
| Evaluation | Storage Stability | B- | A | A+ | A- |
| | Water Resistance | A | B | A | A |

TABLE 3

| No. | | | Ex. 10 | Ex. 11 | Ex. 12 | Ex. 13 |
|---|---|---|---|---|---|---|
| Mixing Formulation (parts by mass) | Base Resin | Kind | 1 | 1 | 1 | 1 |
| | | Amount | 1000 | 1000 | 1000 | 1000 |
| | Anionic Emulsifier | A-1 | — | — | — | — |
| | | A-2 | — | — | — | — |
| | | A-3 | — | — | — | — |
| | | A-4 | — | — | — | — |
| | | A-5 | — | — | — | — |
| | | A-6 | 30 | — | — | — |
| | | A-7 | — | 30 | — | — |
| | | A-8 | — | — | 30 | — |
| | | A-9 | — | — | — | 30 |
| | Nonionic Emulsifier | N-1 | 20 | 20 | 20 | 20 |
| | | N-2 | — | — | — | — |
| | | N-3 | — | — | — | — |
| | | N-4 | — | — | — | — |
| | | N-5 | — | — | — | — |
| | | N-6 | — | — | — | — |
| | Neutralizing Agent | | 2 | 2 | 2 | 2 |
| | Aqueous Dispersion Medium | Water | 1000 | 1000 | 1000 | 1000 |
| Solid Content Concentration (%) | | | 48-55 | 48-55 | 48-55 | 48-55 |
| AO Number of Anionic Emulsifier | | | 20 | 2 | 4 | 50 |
| HLB of Nonionic Emulsifier | | | 18.5 | 18.5 | 18.5 | 18.5 |
| AO Number of Nonionic Emulsifier | | | 80 | 80 | 80 | 80 |
| Evaluation | Storage Stability | | A | B- | B- | B- |
| | Water Resistance | | A | A | A | B- |

TABLE 4

| No. | | | Comparative Ex. 1 | Comparative Ex. 2 | Comparative Ex. 3 | Comparative Ex. 4 | Comparative Ex. 5 | Comparative Ex. 6 |
|---|---|---|---|---|---|---|---|---|
| Mixing Formulation (parts by mass) | Base Resin | Kind | 1 | 1 | 1 | 1 | 1 | 1 |
| | | Amount | 1000 | 1000 | 1000 | 1000 | 1000 | 1000 |
| | Anionic Emulsifier | A-1 | 30 | — | — | — | 30 | — |
| | | A-2 | — | — | — | — | — | — |
| | | A-3 | — | — | — | — | — | — |
| | | A-4 | — | — | — | 45 | — | — |
| | | A-5 | — | — | — | — | — | 30 |
| | | A-6 | — | — | — | — | — | — |
| | | A-7 | — | — | — | — | — | — |
| | | A-8 | — | — | — | — | — | — |
| | | A-9 | — | — | — | — | — | — |
| | Nonionic Emulsifier | N-1 | — | 20 | — | 20 | — | — |
| | | N-2 | — | — | — | — | — | — |
| | | N-3 | — | — | — | — | — | — |
| | | N-4 | — | — | — | — | — | — |
| | | N-5 | — | — | — | — | — | — |
| | | N-6 | — | — | — | — | 20 | 20 |
| | Neutralizing Agent | | 2.5 | 2.5 | 2 | 2.5 | 2.5 | 2.5 |
| | Aqueous Dispersion Medium | Water | 1000 | 1000 | 1000 | 1000 | 1000 | 1000 |
| Solid Content Concentration (%) | | | 48-55 | 48-55 | 48-55 | 48-55 | 48-55 | 48-55 |
| AC Number of Anionic Emulsifier | | | 15 | — | — | — | 15 | — |
| HLB of Nonionic Emulsifier | | | — | 18.5 | — | 18.5 | 15 | 15 |
| AC Number of Nonionic Emulsifier | | | — | 80 | — | 80 | 15 | 15 |
| Evaluation | Storage Stability | | D | D | D | D | C | D |
| | Water Resistance | | D | D | D | D | C | D |

The details of abbreviations in Tables are described below.

AO: alkylene oxide
EO: ethylene oxide
PO: propylene oxide
A-1: sodium polyoxyethylene (EO15) isotridecyl (C13) ether sulfate, EO number of units of 15, anionic emulsifier
A-2: polyoxyethylene (EO9) isotridecyl (C13) ether phosphate, EO number of units of 9, anionic emulsifier
A-3: polyoxyethylene (EO7) oleyl (C18) ether phosphate, EO number of units of 7, anionic emulsifier
A-4: isotridecyl (C13) alcohol ether phosphate, EO number of units of 0, anionic emulsifier
A-5: dodecylbenzenesulfonic acid, EO number of units of 0, anionic emulsifier
A-6: polyoxyethylene (EO20) isotridecyl (C13) ether phosphate, EO number of units of 20, anionic emulsifier
A-7: isotridecyl (C13) alcohol ether sulfate, EO number of units of 2, solid content concentration of 100%, anionic emulsifier
A-8: isotridecyl (C13) alcohol ether sulfate, EO number of units of 4, solid content concentration of 100%, anionic emulsifier
A-9: isotridecyl (C13) alcohol ether sulfate, EO number of units of 50, solid content concentration of 100%, anionic emulsifier
N-1: polyoxyethylene (EO80) oleyl (C18) alcohol, EO number of units of 80, nonionic emulsifier, HLB value of 18.5
N-2: block copolymer of ethylene oxide and propylene oxide (EOPO copolymer), EO number of units of 300, weight average molecular weight of PO polymerization block of 3250, nonionic emulsifier, HLB value of 16
N-3: polyoxyethylene (EO35) oleyl (C18) alcohol, EO number of units of 35, nonionic emulsifier, HLB value of 17.2
N-4: polyoxyethylene (EO100) oleyl (C18) alcohol, EO number of units of 100, nonionic emulsifier, HLB value of 19
N-5: polyoxyethylene (EO60) cetyl oleyl (C17) alcohol, EO number of units of 60, nonionic emulsifier, HLB value of 18.1
N-6: polyoxyethylene (EO15) oleyl (C18) alcohol, EO number of units of 15, nonionic emulsifier, HLB value of 15
HLB: HLB value measured by Griffin method While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The resin composition for an aqueous ink of the present invention is preferably used in coating of food packaging materials.

The invention claimed is:

1. A resin composition for an aqueous ink comprising:
a base resin, an aqueous dispersion medium, and an emulsifier, wherein
the base resin includes a rosin-modified alkyd resin,
the emulsifier includes an anionic emulsifier and a nonionic emulsifier,
the anionic emulsifier includes an oxyalkylene-containing anionic emulsifier,
an HLB value of the nonionic emulsifier is 16.0 or more and 20.0 or less,
the nonionic emulsifier includes an oxyalkylene-containing nonionic emulsifier, the oxyalkylene-containing nonionic emulsifier includes polyoxyalkylene alkyl ethers, and the number of units of oxyalkylene contained in one molecule of the oxyalkylene-containing nonionic emulsifier is 60 or more.

2. The resin composition for an aqueous ink according to claim 1, wherein the number of units of oxyalkylene contained in one molecule of the oxyalkylene-containing anionic emulsifier is 5 or more.

3. The resin composition for an aqueous ink according to claim 1, wherein the number of units of oxyalkylene contained in one molecule of the oxyalkylene-containing anionic emulsifier is 10 or more and 18 or less.

4. The resin composition for an aqueous ink according to claim 1, wherein the nonionic emulsifier contains a block copolymer of ethylene oxide and propylene oxide.

5. The resin composition for an aqueous ink according to claim 1, wherein
the rosin-modified alkyd resin is a reaction product of a resin material containing rosins, a fatty acid and/or an oil and fat, a polybasic acid, and a polyhydric alcohol.

6. The resin composition for an aqueous ink according to claim 5, wherein
the polybasic acid includes an aromatic dicarboxylic acid.

7. The resin composition for an aqueous ink according to claim 6, wherein
a content ratio of the aromatic dicarboxylic acid with respect to the total amount of the resin material is 11% by mass or more and 23% by mass or less.

8. The resin composition for an aqueous ink according to claim 1, wherein
the number of units of oxyalkylene contained in one molecule of the oxyalkylene-containing nonionic emulsifier is 80 or more.

* * * * *